(12) United States Patent
Tomov et al.

(10) Patent No.: US 6,737,483 B1
(45) Date of Patent: May 18, 2004

(54) METHOD FOR POLYMERISING OLEFINS IN THE PRESENCE OF WATER

(76) Inventors: Atanas Tomov, 3, Westfield Road, Croydon (GB), O2O 3RH; Roger Spitz, 30, rue Jean Broquin, Lyons (FR), F-69006; Thierry Saudemont, Berenshade, Bruxelles (BE), B-1170; Xavier Drujon, 23 Rue de L'ouest 75014, Paris (FR), F-64110

( * ) Notice: Subject to any disclaimer, the term of this patent is extended or adjusted under 35 U.S.C. 154(b) by 0 days.

(21) Appl. No.: 09/806,954
(22) PCT Filed: Oct. 5, 1999
(86) PCT No.: PCT/FR99/02372
§ 371 (c)(1), (2), (4) Date: Apr. 5, 2001
(87) PCT Pub. No.: WO00/20464
PCT Pub. Date: Apr. 13, 2000

(65) Prior Publication Data
(65)

(30) Foreign Application Priority Data

Oct. 6, 1998 (FR) ............................................. 98 12476

(51) Int. Cl.⁷ .............................. C08F 2/18; C08F 2/22; C08F 4/80; C08F 10/02
(52) U.S. Cl. ......................... 526/93; 524/836; 526/348; 526/352; 526/352.2
(58) Field of Search ........................... 524/836; 526/93, 526/348, 352, 352.2

(56) References Cited

U.S. PATENT DOCUMENTS

| | | | |
|---|---|---|---|
| 4,537,982 A | | 8/1985 | Starzewski et al. |
| 4,711,969 A | | 12/1987 | Beach et al. |
| 4,716,205 A | * | 12/1987 | Klabunde .................. 526/115 |
| 5,026,675 A | | 6/1991 | Braca et al. |
| 5,030,606 A | | 7/1991 | Klabunde |
| 5,401,805 A | | 3/1995 | Chung et al. |
| 5,866,663 A | | 2/1999 | Brookhart et al. |
| 5,886,224 A | | 3/1999 | Brookhart et al. |
| 5,916,989 A | | 6/1999 | Brookhart, III et al. |
| 5,929,181 A | * | 7/1999 | Makovetsky et al. ....... 526/171 |

FOREIGN PATENT DOCUMENTS

| | | | | |
|---|---|---|---|---|
| BG | 60319 | | 11/1994 | |
| DE | 2603510 | | 8/1977 | |
| DE | 4415725 A1 | * | 11/1994 | ........... C07F/15/04 |
| DE | 4435404 | | 4/1996 | |
| EP | 589527 | | 3/1994 | |
| WO | WO 96 10599 | | 4/1996 | |
| WO | WO 96 23010 | | 8/1996 | |
| WO | WO 97 17380 | | 5/1997 | |

OTHER PUBLICATIONS

Jiang et al. 1994. Water–soluble palladium(II) compounds as catalysts for the alternating copolymerization of olefins with carbon monoxide in an aqueous medium, Macromolecules 27:7215–16.
Kelm, W 1994. Organometallic complexes as catalyst precursors: value and usefulness. New J. Chem. 28:93–96.
Kurtev et al. 1993. Ethene polymerization by binuclear nickel–ylide complexes. J. Mol. Catalysis 88:141–50.
Matt et al. 1993. Nickle complexes with heterofunctionalized phosphine ligands. Catalytic oligomerization of ethylene with [Ni($C_5Ph_5$)]{$Ph_2PCH=C(O)Ph$}]. Chem. Soc. (Dalton Transition). 1173–78.
Mitkova et al. 1996. A kinetic study of propylene dimerization by binuclear nickel–ylide complexes in presence of diethylaluminum chloride as cocatalyst. J. Mol. Catalysis 110:25–32.
Panchenko et al. 1995. Polymerization of ethylene on supported catalysts based on organic chelate nickel complexes. Polymer Science Series A 37:867–73.
Puech et al. 1997. A new route to concentrated microlatex of homogeneous particle size: oligomerization of.
Starzewski et al. 1985. Highly active ylide–neckel catalysts for the polymerization of ethylene. Angew. Chem. Int. Ed. Engl. 24:599–601.
Starzewski et al. 1987. Control of the molecular weight of polyethene in synthese with bis(ylide)nickel catalysts. Angew. Chem. Int. Ed. Engl. 26:63–64.
Tomov et al. 1995. Binuclear nickel–ylide complexes as effective ethylene oligomerization/polymerization catalysts. J. Mol. Catalysis 103:95–103.

* cited by examiner

Primary Examiner—Kelechi C. Egwim
(74) Attorney, Agent, or Firm—Jones Day

(57) ABSTRACT

The invention concerns a method for polymerising at least one olefin in the presence of at least a catalyst comprising a sequence E—M—X wherein E represents an oxygen or sulphur atom; M represents a nickel or palladium or platinum atom; X represents a phosphorus, arsenic or antimony atom in a medium comprising a continuous liquid phase containing more than 30 wt. % of water. The method can result in a polymer latex of at least one olefin.

37 Claims, No Drawings

METHOD FOR POLYMERISING OLEFINS IN THE PRESENCE OF WATER

The invention relates to a process for the polymerization of at least one olefin in the presence of at least one catalyst comprising at least one E—M—X linkage, in which E represents an oxygen or sulfur atom, M represents a nickel or palladium or platinum atom and X represents a phosphorus, arsenic or antimony atom, in a medium comprising a continuous liquid phase which comprises more than 30% by weight of water. The liquid phase comprising more than 30% by weight of water is subsequently referred to as the "aqueous phase".

The polymerization of olefins by Ziegler catalysis usually involves highly hydrolyzable, indeed even pyrophoric, compounds (catalyst and cocatalysts) and it is desirable to be able to employ catalysts which are less problematic to handle, transport and store. Furthermore, there exists a need for polymerization processes in water, water being one of the easiest compounds to obtain access to and being a preferred solvent in numerous applications (coatings or adhesives, for example).

Nickel catalysts have been disclosed for operating in essentially organic media, as in the following documents: U.S. Pat. No. 4,711,969, U.S. Pat. No. 5,030,606 and BG 60319.

The process according to the invention involves a catalyst comprising at least one nickel or palladium or platinum atom and involves a high proportion of water.

The process according to the invention responds to the abovementioned problems and leads to a polyolefin with a high productivity in a water-rich medium. Furthermore, the process according to the invention does not require the use of a cocatalyst capable of activating the metal of the catalyst.

The invention furthermore opens a novel access route to polyolefin latices.

In the catalyst to which the invention makes recourse, the E—M—X linkage preferably forms part of a ring comprising five atoms, two of which are carbon atoms bonded to one another via a double bond.

Generally, the metal M is bonded, before its introduction into the polymerization medium, to a ligand L. This ligand L has in particular the role of stabilizing the structure of the catalyst before it is used and of facilitating the storage and handling thereof. Before or during the polymerization, a scavenger compound is brought together with the catalyst so as to separate the ligand L from the metal M and to allow the polymerization to take place. Without the present explanation constituting in any way a limitation on the scope of the present application, it seems that the distancing of the ligand, by allowing the olefin to approach the metal M, plays an important role in the catalytic polymerization mechanism.

Thus, in the context of the present application, when a catalyst is represented so that its metal M, which can be Ni, Pd or Pt, comprises a nonattributed valency represented by a dash, as in -M, it should be understood that this valency plays the role which has just been explained, namely to be occupied by a ligand L and to be released from the ligand for the polymerization.

The catalyst may comprise only a single atom of metal M. Such a catalyst, said to be monometallic, can comprise, for example, the structure represented by the formula (1)

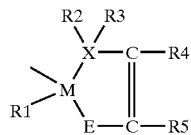

(1)

in which the $R^1$, $R^2$, $R^3$, $R^4$ and $R^5$ radicals, which can be identical or different, can be chosen from hydrogen, alkyl, cycloalkyl, aryl, alkylaryl or arylalkyl radicals, halogens, the hydroxyl radical, alkoxide radicals, —C(O)OR', in which R' represents a hydro-carbonaceous radical which can comprise from 1 to 15 carbon atoms, or —$SO_3Y$, in which Y is chosen from Li, Na, K, $NH_4^\oplus$ or $NR''_4^\oplus$, in which R" represents a hydro-carbonaceous radical which can comprise from 1 to 15 carbon atoms, E, M and X having the meanings given above and it being possible for the nonattributed valency connected to M, represented by a dash in the above formula, to be occupied by a ligand L to facilitate the use of the catalyst, as has already been explained.

The linkage(s) of the E—M—X type of the catalyst can be such that M is a nickel atom, E is an oxygen atom and X is a phosphorus atom.

The catalyst preferably comprises at least two E—M—X linkages.

The E—M—X linkages are preferably separated from one another via intermediate atoms bonded to one another via covalent or coordination bonds, the minimum number of atoms between two M atoms preferably ranging from 6 to 42. The term "minimum number of atoms between two M atoms" is understood to mean the minimum number of atoms which is encountered in the molecule of the catalyst when moving from one of the M atoms to the other of the M atoms by following the bonds atom by atom. By way of example, if the catalyst comprises the structure:

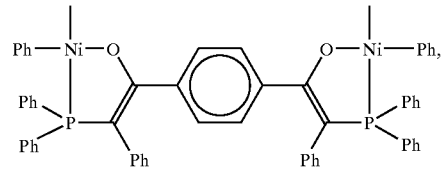

in which Ph represents a phenyl radical, the minimum number of atoms between the Ni atoms is 8 (which corresponds to the linkage: —O—C—C—C—C—C—C—O—), as it is not possible to encounter fewer than 8 atoms when moving from the first Ni to the second Ni.

The catalyst may comprise only two M atoms in its structure.

The catalyst can; for example, be one of those represented by the following formula (2):

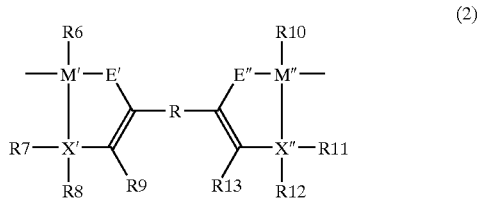

(2)

in which the $R^6$, $R^7$, $R^8$, $R^9$, $R^{10}$, $R^{11}$, $R^{12}$ and $R^{13}$ radicals, which can be identical or different, can be chosen from the same list of radicals as $R^1$ to $R^5$ above, E'—M'—X' and E"—M"—X" being two linkages of E—M—X type which can be identical or different and R being a bivalent radical.

The R radical can be chosen from bivalent hydrocarbonaceous radicals comprising, for example, 2 to 38 carbon atoms, such as alkylene, alkenylene, arylene, cycloalkylene, bicycloalkylene or alkylarylene radicals. The R radical can also be a 1,1'-ferro-cenylene radical which can be substituted, for example by one or two monovalent radicals such as —C(O)OR' or —SO$_3$Y, R and Y having the meanings already given.

By way of examples, the catalyst can be one of those comprising the structures hereinbelow:

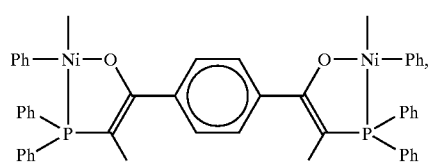

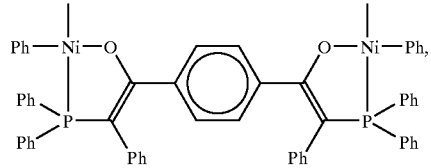

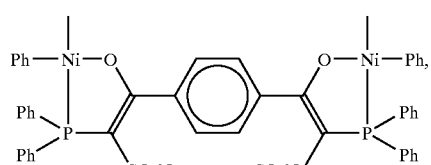

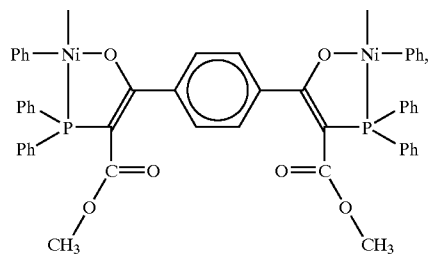

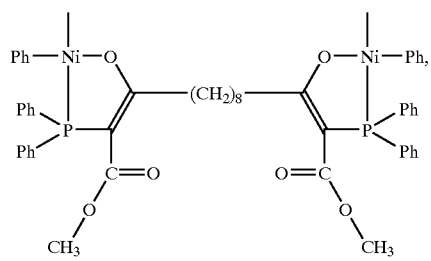

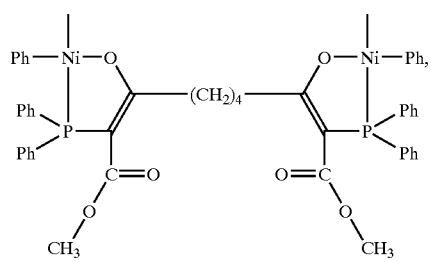

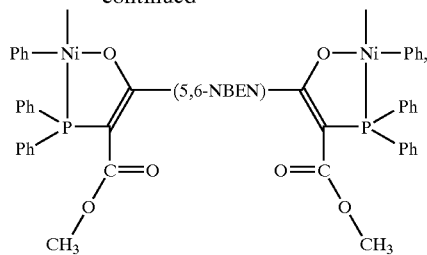

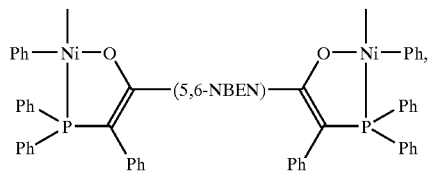

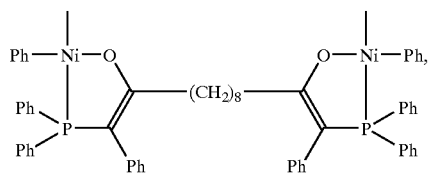

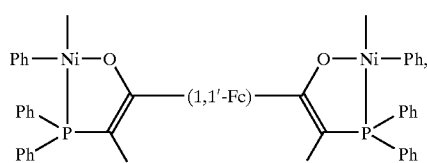

in which Ph represents a phenyl radical, —(5,6-NBEN)— represents a 5,6-bicyclo[2,2,1]hept-2-ene radical, that is to say which can be represented by:

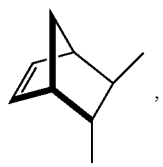

and —(1,1'-Fc)— represents a 1,1'-ferrocenylene radical.

In order to achieve better preservation of the integrity and thus of the effectiveness of the catalyst during its storage before use in polymerization, it is advisable to complex the atoms of metal M with a ligand L, so as to protect said M atoms by steric hindrance. Such protection is recommended in order to minimize the risks of reduction of the M atom, which can be reflected by a fall in or a loss of activity of the catalyst.

When the catalyst is used in polymerization, it is advisable to separate the ligand L from the M atom or atoms so that the latter can play their role in the activation of the polymerization reaction. The ligand can be separated before the polymerization and may even not be introduced into the polymerization medium. However, it may be left in the polymerization medium and may be even be introduced into the polymerization medium in the form complexed with the catalyst, provided that said medium comprises a scavenger compound capable of complexing of or combining in any appropriate fashion with the ligand so as to release the atoms of metal M from their complexing and thus to facilitate the polymerization. The scavenger compound must form a bond with the ligand which is sufficiently strong for the ligand to release the catalyst. It is generally possible to make use of the ligand from the synthesis of the catalyst, so that the formation of the catalyst takes place in the form complexed with the ligand.

Thus, for example, in the case of the bimetallic catalyst corresponding to the formula

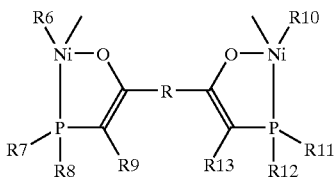

in which the R and $R^6$ to $R^{13}$ radicals have the meanings already given in the context of the formula (2), said catalysts can be prepared by reaction of a bis(α-ketoylide) with a nickel(0) compound in the presence of triphenylphosphine (PPh$_3$), which acts as ligand, according to the following reaction scheme:

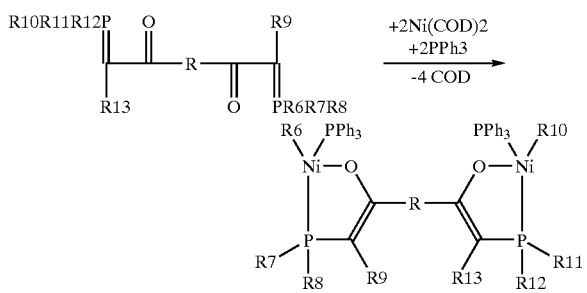

COD representing a cis,cis-1,5-cyclooctadiene radical and Ph representing a phenyl radical.

The catalyst is thus obtained by this synthesis in the complexed form, each catalyst molecule being complexed by two triphenylphosphine molecules.

In the broader context of the present application, use may generally be made, as ligand, of a compound chosen from phosphines of formula $PR^{14}R^{15}R^{16}$, in which $R^{14}$, $R^{15}$ and $R^{16}$, which can be identical or different, can represent alkyl, aryl, alkylaryl or arylalkyl radicals, or from phosphine oxides, ethers, esters, nitriles, ketones, amines, pyridine, substituted pyridines or alcohols.

The scavenger compound can, for example, be chosen from amine oxides, organic hydroperoxides, hydrogen peroxide or complexes of metals from Columns 8, 9 and 10 of the Periodic Table of the Elements according to the new notation as defined in the Handbook of Chemistry and Physics, 75th edition, 1994–1995, such as, for example, bis(1,5-cyclooctadiene)-nickel(0), (tetrakis(ethylene)-μ-dichlorodirhodium, bis(ethylene)acetylacetonerhodium(I), bis(aceto-nitrile)palladium(II), tetracarbonylnickel or triethylenenickel.

If the catalyst is introduced into the polymerization medium in the form complexed with a ligand, the scavenger compound must be introduced into the polymerization medium in an amount sufficient to release the catalyst from the ligand. Generally, the scavenger compound can be introduced into the polymerization medium in a proportion of 0.1 to 100 mol per mole of metal M contributed by the catalyst.

If the polymerization medium comprises only the aqueous phase as liquid phase, it is preferable for the catalyst and the optional scavenger compound to be soluble in said aqueous phase. In this case, it is possible to introduce, into the aqueous phase, a third organic substance which promotes the dissolution of the catalyst and/or of the optional scavenger compound in said aqueous phase for the case where this will be necessary so as to obtain complete dissolution of the catalyst and/or of the optional scavenger compound in the aqueous phase.

Such a third organic substance is thus soluble in the aqueous phase and can generally be an alcohol, such as methanol, or a ketone, such as acetone. Such a third substance can be introduced into the aqueous phase in a proportion, for example, of 5 to 15% by weight.

If the catalyst cannot be completely dissolved in the aqueous phase, it is possible to add, to the medium, a liquid organic phase which dissolves the catalyst enough for the latter to be completely dissolved in the polymerization medium, if appropriate partially in the aqueous phase and partially in the liquid organic phase.

Generally, the catalyst is completely dissolved in a liquid organic phase before the polymerization.

It is possible to introduce a liquid organic phase into the polymerization medium even if the catalyst is able to be completely dissolved in the aqueous phase.

The liquid organic phase can comprise an organic solvent and/or an olefin to be polymerized.

During the polymerization, the polymerization medium comprises the liquid aqueous phase and a solid phase composed of the solid polymer resulting from the polymerization and also comprises, according to the physical state of the olefin to be polymerized, at least one other gas phase and/or one other liquid phase. If an olefin to be polymerized is liquid under the temperature and pressure conditions of the polymerization, this olefin can form part of a liquid organic phase separate from the liquid aqueous phase. Such a liquid organic phase can also comprise an organic solvent for said olefin.

The constituents of the optional liquid organic phase are sufficiently insoluble in water for, in view of its amount involved, the aqueous phase always to comprise more than 30% of water.

The organic solvent can be chosen from saturated aliphatic, saturated alicyclic or aromatic hydrocarbons, such as, for example, isobutane, butane, pentane, hexane, heptane, isododecane, cyclohexane, cycloheptane, methylcyclohexane, methylcycloheptane, toluene, ortho-xylene or para-xylene.

The organic solvent can also be chosen from alcohols and can be a monoalcohol or a diol comprising, for example, 5 to 20 carbon atoms.

The organic solvent can be an ether comprising, for example, 3 to 15 carbon atoms, such as, for example, tetrahydrofuran or dioxane.

The organic solvent can be an ester comprising, for example, from 2 to 15 carbon atoms, such as, for example, ethyl or butyl or vinyl acetate or methyl acrylate.

For the case where the polymerization medium comprises two separate liquid phases, these can, for example, be present so that the phase other than the aqueous phase represents 1 to 50% of the volume of the aqueous phase.

The aqueous phase can comprise at least 40%, indeed even at least 50%, indeed even at least 60%, indeed even at least 70%, indeed even at least 80%, by weight of water.

The aqueous phase can comprise, in the dissolved form, an organic compound which can be an alcohol or a ketone or a diol, such as a glycol, for example ethylene glycol, or such as propanediol or butanediol. This organic compound can have the role of increasing the solubility in the aqueous phase of the olefin to be polymerized.

The catalyst is generally dissolved in at least one liquid phase before polymerization in a proportion of 0.1 micromol to 2 mol per liter and preferably of 1 micromol to 0.1 mol per liter.

Preferably, the optional scavenger compound is at least partially, and more preferably completely, dissolved in one or more liquid phases of the polymerization medium. In the case of the presence of at least one liquid organic phase, the scavenger compound will be, according to its nature and thus its affinity for one or other of the liquid phases, predominantly dissolved in the aqueous phase or predominantly dissolved in the liquid organic phase.

The polymerization medium is preferably stirred. The stirring is preferably sufficient to distribute the various phases uniformly in the reactor.

At least one dispersing agent can be added to the polymerization medium. Such a dispersing agent can in particular be used when the polymerization medium comprises a liquid organic phase, in which case it helps in the dispersion of said liquid organic phase in the form of droplets surrounded by the continuous aqueous phase. In this case, and in the case where the catalyst has been mainly dissolved in the liquid organic phase, the polymerization will mainly take place in the droplets, the latter generally exhibiting a mean diameter of between 100 µm and 3 millimeters. Such a process is similar to the process referred to as "radical suspension polymerization", except that it does involve radicals.

The dispersing agent can be one of those known for having this function, such as, for example, a polyvinyl alcohol, methycellulose, a gelatin, kaolin, bariumsulfate, hydroxyapatite, magnesium silicate, tricalcium phosphate or a combination of several of these dispersing agents.

The dispersing agent can be introduced into the polymerization medium up to 10% by weight with respect to the weight of water used and preferably of 0.01% to 5% by weight with respect to the weight of water used.

At least one emulsifying agent can be added to the polymerization medium. The use of such an emulsifying agent is particularly recommended when it is desired for the polymerization to result in a latex, that is to say in an assembly of polymer particles exhibiting a mean diameter by number of less than 1 micrometer, said particles being dispersed in the aqueous phase. When an emulsifying agent is used, it is generally unnecessary for the polymerization medium to comprise a dispersing agent.

Use may be made, as emulsifying agent, of any one of the known surface-active agents, whether anionic, nonionic or even cationic. In particular, the emulsifying agent can be chosen from anionic surface-active agents, such as the sodium or potassium salts of fatty acids, in particular sodium laurate, sodium stearate, sodium palmitate or sodium oleate, the mixed sulfates of sodium or of potassium and of fatty alcohol, in particular sodium lauryl sulfate, the sodium or potassium salts of sulfosuccinic esters, the sodium or potassium salts of alkylarylsulfonic acids, in particular sodium dodecylbenzenesulfonate, and the sodium or potassium salts of monosulfonates of fatty monoglycerides, or from nonionic surfactants, such as the reaction products of ethylene oxide with alkylphenols. Mixtures of such surface-active agents can, of course, be used.

The emulsifying agent can be introduced into the polymerization medium up to 10% by weight with respect to the weight of water and preferably of 0.01% to 5% by weight with respect to the weight of water, for example of 0.01% to 3% by weight with respect to the weight of water.

In such a process comprising an emulsifying agent and in the case where it comprises a liquid organic phase, the catalyst having been mainly dissolved in said liquid organic phase and the emulsifying agent being in an amount greater than the critical micelle concentration, the polymerization takes place in the droplets of liquid organic phase, which droplets generally exhibit a mean diameter of between 1 µm and 1000 µm, and in the micelles, which micelles generally exhibit a mean diameter of between 1 nanometer and 100 nanometers. Such a process is similar to the process referred to as "radical emulsion polymerization", except that it does not involve radicals. When, in such a process, the concentration of emulsifying agent is increased, the relative importance of the polymerization which takes place in the micelles is increased and the formation of a latex at the end of the polymerization is promoted. In the case of the presence of a liquid organic phase, when the amount of emulsifying agent is such that all the liquid organic phase is present in the micelles, the process is similar to the process referred to as "radical microemulsion polymerization", except that the polymerization does not involve radicals.

For the case where the polymerization medium comprises a liquid organic phase and an emulsifying agent, it is possible to add a cosurfactant to the medium, as is done for miniemulsion polymerization processes. Such a cosurfactant generally exhibits a solubility in water of less than $1 \times 10^{-3}$ mol per liter at 20° C. Such a cosurfactant can, for example, be hexadecane or cethyl alcohol. It can be present up to 10% by weight with respect to the weight of water and preferably the ratio of the mass of emulsifying agent to that of cosurfactant ranges from 0.5 to 2. The presence of this cosurfactant makes it possible, by virtue also of sufficient shearing of the medium, to obtain droplets of liquid organic phase of less than 1 µm and promotes the formation of a latex at the end of the polymerization. Sufficient shearing can be obtained, for example, by ultrasound or by a homogenizer (such as a device of the Ultra-Turrax type or Diax 600 type from Heidolph), ultrasound being preferred. Once the characteristic size (<1 µm) of the droplets is obtained, stirring can be continued with less vigorous shearing, of the type of the shearing used for suspension polymerization processes.

In the case where an organic solvent has been used, the latter can, if desired, be removed by evaporation.

The process according to the invention results in polymer particles with a diameter which can range from 10 nanometers to 5 millimeters.

In the case where the polymerization comprises an emulsifying agent, a latex is obtained. On conclusion of the polymerization carried out in the presence of an emulsifying agent, the latex may comprise particles which have a tendency to separate by settling and it may be desired to carry out a separation, for example by filtration, so as to remove these particles, which do not form part of the latex.

The polymerization conditions, namely amount of the ingredients in the polymerization medium and degree of conversion of monomer to polymer, can be adjusted so that the latex exhibits a solids content ranging from 0.1 to 50% by weight.

The olefin intended to be polymerized is introduced with sufficient stirring of the polymerization medium, for example stirring ranging from 10 to 10 000 revolutions per minute. The olefin can be introduced in the liquid or gaseous form, according to its physical state.

The polymerization can take place between 0 and 300° C. and preferably between 25 and 200° C., at a total absolute pressure ranging from 1 to 200 bar and preferably from 1 to 100 bar. If the polymer to be formed is at least partially crystalline, the polymerization is generally carried out at a temperature below the melting point of the polymer to be formed.

In the case where only ethylene is polymerized, a high-density homopolyethylene is obtained. The polymerization of ethylene with at least one other olefin than ethylene leads to the production of an ethylene polymer with a lower density than the high-density homopolyethylene mentioned above. Depending upon the amount and the nature of the comonomer(s) of the ethylene, it is thus possible to obtain a high-density ethylene polymer (high-density polyethylene) or a medium-density ethylene polymer (medium-density polyethylene), indeed even, at a high content of comonomer, a low-density ethylene polymer (low-density polyethylene).

As is the practice for ethylene polymers, the term "high-density" is understood to mean the fact that the relative density is greater than 0.940, the term "medium-density" is understood to mean the fact that the relative density ranges from 0.925 to 0.940 and the term "low-density" is understood to mean the fact that the relative density is less than 0.925.

The polymerization can thus result in a latex of a polymer of at least one olefin, that is to say in a polymer comprising polymerized units of at least one olefin, if appropriate with other units of polymerized monomer. In particular, if at least one olefin is ethylene, a latex of an ethylene polymer can be obtained.

The process according to the invention can thus result in a latex of a high-density ethylene polymer or in a latex of a medium-density ethylene polymer, indeed even of a low-density ethylene polymer.

In the context of the present application, the term "polymer" must be taken in its general sense, so that it covers homopolymers, copolymers, interpolymers and blends of polymers. The term "polymerization" must also be taken in an equivalent general sense.

The group of the olefins comprises that of the α-olefins. Mention may be made, as olefins, of ethylene, propylene, cyclopentene, 1-hexene, 3-methyl-1-pentene, 4-methyl-1-pentene, 1,4-hexadiene, 1,9-decadiene, 1-octene or 1-decene. The group of the olefins also includes the compounds of formula $CH_2=CH-(CH_2)_n-G$ in which n represents an integer ranging from 2 to 20 and G represents a radical which can be chosen from the following list: —OH, —CHOHCH$_2$OH, —OT, —CF$_3$, —COOT, —COOH, —Si(OH)$_3$ or —Si(OT)$_3$, T representing a hydrocarbonaceous radical comprising from 1 to 20 carbon atoms.

The process according to the invention can be carried out batchwise, semicontinuously or continuously.

In the examples, the following abbreviations were used:

Mw: weight-average molecular mass,

Mn: number-average molecular mass.

In the examples, the sizes of particles were measured by column hydrodynamic fractionation using a CHDF 2000 device from Matec Applied Sciences.

Preparation of a Catalyst A 120 ml of toluene, then 10 millimol of triphenylphosphine, then 10 millimol of bis(cis,cis-1,5-cyclooctadiene)nickel(0) and 5 millimol of exo,endo-2,3-bis [2-phenyl-2-(triphenyl-phosphoranylidene)acetyl]bicyclo [2,2,1]hept-5-ene are introduced under a nitrogen atmosphere into a jacketed glass reactor equipped with a mechanical stirring system and with a temperature control, the reactor being maintained at 0° C. The reactor is allowed to return to ambient temperature over 30 min and is left stirring for 18 hours at ambient temperature and then for 1 hour at 50° C. After returning to ambient temperature, 150 ml of n-heptane are added, which is reflected by precipitation of the catalyst in the form complexed by triphenylphosphine. This catalyst is filtered off and washed with 3 times 40 ml of n-heptane and dried at ambient temperature under vacuum.

This catalyst, exo,endo-[1,1'-bis{1-(diphenylphosphino)-1-phenylmethylene}-bicyclo[2,2,1]hept-2-eneendimethylenolato-2,3-O,P;O',P'-bis(triphenylphosphino)diphenyl-dinickel(II), exhibits the following expanded structure:

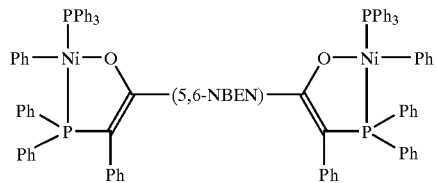

in which (5,6-NBEN) represents a 5,6-bicyclo[2,2,1]hept-2-ene radical and pH represents a phenyl radical.

Preparation of a Catalyst B

The preparation is carried out as for the preparation of the catalyst A, except that 5 millimol of exo,endo-2,3-bis[2-metoxycarbonyl-2-(triphenylphosphoranylidene)acetyl]bicyclo(2,2,1)hept-5-ene are used instead of the 5 millimol of exo,endo-2,3-bis-[2-phenyl-2-(triphenylphosphoranylidene)acetyl]-bicyclo[2,2,1]hept-5-ene. This catalyst, exo,endo-[1,1'-bis{1-(diphenylphosphino)-1-methoxycarbonyl-methylene)bicyclo[2,2,1]hept-2-eneendimethylenolato-2,3-O,P;O',P'-bis(triphenylphosphino)diphenyl-dinickel(II), exhibits the following expanded structure:

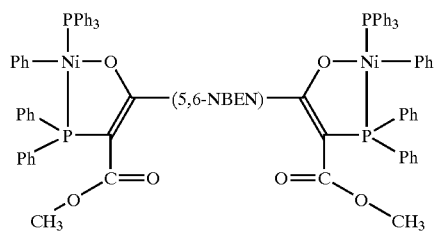

in which (5,6-NBEN) represents a 5,6-bicyclo[2,2,1]hept-2-ene radical and Ph represents a phenyl radical.

Preparation of a Catalyst C 400 ml of toluene, 10 millimol of bis(cis,cis-1,5-cyclooctadiene)nickel(0) and 10 millimol of methyl (tricyclo[3,3,1,1$^{3,7}$]decyl-triphenylphosphoranylideno) acetate are introduced under a nitrogen atmosphere into a jacketed glass reactor equipped with a mechanical stirring system and with a temperature control, the reactor being maintained at 0° C. The reactor is allowed to return to ambient temperature over 30 minutes and is left stirring for 24 hours at ambient temperature. The temperature is subsequently brought to 50° C. and evaporation is carried out under vacuum. The dark red residue recovered is dissolved in 100 ml of toluene, and 400 ml of heptane are subsequently added. The temperature of the mixture is lowered to 0° C. and maintained thus for 4 hours. The precipitate obtained, [1-(diphenylphosphino)-2-methoxy]tricyclo[3,3,1,1$^{3,7}$] decanethylenolato-O,P-(triphenylphosphino)phenylnickel (II), is filtered off, then washed with 2 times 25 ml of heptane and dried under vacuum at ambient temperature. 4.4 g of catalyst are recovered.

EXAMPLE 1

Homopolymerization of Ethylene 250 mg of catalyst A and 650 mg of bis(cis,cis-1,5-cyclooctadiene)nickel(0) are dissolved, with stirring and at ambient temperature, in 45 ml of toluene. This solution is placed in a 2 500 ml metal reactor heated at 62° C. comprising 2 000 ml of a 3 g/l solution of sodium dodecyl sulfate (SDS) in water. This mixture is stirred at 1 000 revolutions per minute. After 2 minutes, ethylene is introduced in the vapor form so as to obtain, in the reactor, a total pressure of 28 bar. After polymerizing for three hours at 62° C., the pressure in the reactor has fallen to 16 bar and the reactor is brought back to ambient temperature. After having removed the remaining ethylene, the polymerization product is filtered off and the cake remaining on the filter is washed with water and dried in an oven at approximately 80° C. for 15 hours. After drying, 120 g of polyethylene are recovered on the filter, which polyethylene has the following characteristics: Mw=102 400 g/mol, Mn=3 413 g/mol. The filtrate is composed of polyethylene particles in suspension in water, forming a latex. The solids content is 1.2% by weight, i.e. 22 g of polyethylene in the latex form. The polyethylene particles of the latex exhibit a mean diameter by number of 138 nm.

EXAMPLE 2

Homopolymerization of Ethylyne

The polymerization is carried out in the same way as in example 1, except that the 250 mg of catalyst A are replaced by 45 mg of catalyst B, that 200 mg of bis(cis,cis-1,5-cyclooctadiene)nickel are used in place of 650 mg, and that dissolution is carried out in 40 ml of toluene in place of 45 ml. The polymerization is carried out at 65° C. The initial ethylene pressure in the reactor is 36 bar. After polymerizing for three hours, it has fallen to 17 bar. 156 g of polyethylene are recovered on the filter, which polyethylene has the following characteristics: Mw=26 150 g/mol, Mn=1 560 g/mol and Mw/Mn=16.8. The filtrate is a latex with a solids content of 1.2% by weight, i.e. 22 g of polyethylene in the latex form.

EXAMPLE 3

2 l of deionized water are introduced into a 2.5 l Schlenck tube and are sparged with nitrogen for 12 h, so as to remove the oxygen. 200 ml of this water are withdrawn, are introduced into a 300 ml Schlenck tube with 6 g of sodium lauryl sulfate (SLS) and are sparged with nitrogen for 2 h.

The contents of the second Schlenck tube are reintroduced into the first tube. The entire mixture is then placed, still under a nitrogen atmosphere, in a 6 l metal reactor equipped with a mechanical stirrer which is maintained at 45° C. 160 mg of catalyst A and 320 mg of bis(cis,cis-1,5-cyclooctadiene)nickel, in the pulverulent form, are introduced into a 200 ml Schlenck tube, followed by 50 ml of-toluene. The entire mixture is stirred for 1 minute at ambient temperature and then introduced into the metal reactor.

The reactor is placed under 15 bar of ethylene, stirring is maintained at 750 revolutions per minute and the temperature is brought to 65° C. Once this temperature is reached, the stirring speed is lowered to 450 revolutions per minute and the ethylene pressure is brought to 20 bar and kept constant throughout the duration of the polymerization.

After 90 minutes at 20 bar, the temperature of the reactor is lowered to 20° C. and slow degassing is carried out over 20 minutes.

The polymerization product is filtered off and the cake remaining on the filter is washed with water and dried in an oven at approximately 80° C. for 15 hours. After drying, 35 g of polyethylene are recovered on the filter, the polyethylene being such that Mw=26 000 g/mol and Mw/Mn=21.8.

The filtrate is a latex exhibiting a solids content of 3%. The polyethylene of the latex is linear, with Mw=1 600 g/mol and Mw/Mn=4.5.

EXAMPLE 4

2 l of deionized water are introduced into a 2.5 l Schlenck tube and are sparged with nitrogen for 12 h. 200 ml of this water are withdrawn, are introduced into a 300 ml Schlenck tube with 6 g of sodium lauryl sulfate (SLS) and are sparged with nitrogen for 2 h. 3 ml of hexadecane are subsequently added. The contents of the second Schlenck tube are reintroduced into the first tube. 300 mg of catalyst A and 600 mg of bis(cis,cis-1,5-cyclooctadiene)nickel, in the pulverulent form, are introduced into a 200 ml Schlenck tube, followed by 50 ml of toluene, and stirring is carried out for 1 minute at ambient temperature. This solution is added to the aqueous phase. The entire mixture is subsequently homogenized, still under a nitrogen atmosphere, by means of an Ultra-Turrax homogenizer for 5 minutes at 1 500 revolutions per minute. The miniemulsion obtained is introduced into a 6 l metal reactor equipped with a mechanical stirrer which is maintained at 45° C.

The reactor is placed under 2 bar of ethylene and its temperature is brought to 65° C. with stirring at 400 revolutions per minute. When the temperature has reached 65° C., the ethylene pressure is brought to 20 bar and kept constant for 90 minutes.

The temperature is subsequently lowered to 20° C. and the reactor is gradually degassed for 20 minutes. 45 g of polymer are recovered in the form of a dispersion, which slowly deposits sediment. The polyethylene obtained is linear, with Mw=8 700 and Mw/Mn=12.8.

EXAMPLE 5

The polymerization is carried out as for example 4, except that 76 mg of catalyst C are used in place of 300 mg of catalyst A and 181 mg of bis(cis,cis-1,5-cyclooctadiene)nickel are used in place of 600 mg and except that the reactor is maintained at 50° C. in place of 45° C. during the introduction of the miniemulsion. After filtration, 21.5 g of polyethylene, with Mw=12 760 and Mn=1 080, are recovered above the filter. A latex is obtained under the filter. This latex exhibits a solids content of 0.9% and comprises 9.7 g of polyethylene, which polyethylene exhibits an Mw of 11 680 and an Mn of 848.

What is claimed is:

1. A process for the preparation of a latex of a polymer of at least one olefin comprising a stage of polymerization of at least one olefin, the polymerization medium comprising, during the polymerization, a solid phase composed of the solid polymer resulting from the polymerization, a continuous liquid aqueous phase comprising more than 30% by weight of water, and at least one emulsifying agent, said polymerization being carried out in the presence of a catalyst comprising at least one E—M—X linkage in which E represents an oxygen or sulfur atom, M represents a nickel or palladium or platinum atom and X represents a phosphorus, arsenic or antimony atom.

2. The process as claimed in claim 1, characterized in that the catalyst exhibits at least two E—M—X linkages.

3. The process as claimed in claim 2, characterized in that the E—M—X linkages are separated from one another so that the minimum number of atoms between two M atoms ranges from 6 to 42.

4. The process as claimed in claim 1, characterized in that the catalyst comprises the structure:

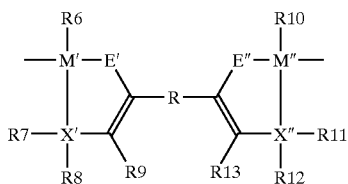

in which E'—M'—X' and E"—M"—X" are two linkages of E—M—X type and in which the R6, R7, R8, R9, R10, R11, R12 and R13 radicals, which can be identical or different, are chosen from hydrogen, alkyl, cycloalkyl, aryl, alkylaryl or arylalkyl radicals, halogens, the hydroxyl radical, alkoxide radicals, —C(O)OR', in which R', represents a hydrocarbonaceous radical which can comprise from 1 to 15 carbon atoms, or —SO$_3$Y, in which Y is chosen from Li, Na, K, NH$_4^+$ or NR"$_4^+$, in which R" represents a hydrocarbonaceous radical which can comprise from 1 to 15 carbon atoms, R being a bivalent radical.

5. The process as claimed in claim 4, characterized in that R is a bivalent hydrocarbonaceous radical comprising from 2 to 38 carbon atoms.

6. The process as claimed in claim 4, characterized in that R is an optionally substituted 1,1'-ferrocenylene radical.

7. The process as claimed in claim 1, characterized in that E is an oxygen atom, M is a nickel atom and X is a phosphorus atom.

8. The process as claimed in claim 1, characterized in that the catalyst comprises the structure:

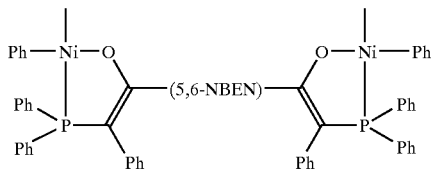

in which (5,6-NBEN) represents a 5,6-bicyclo[2,2,1]hept-2-ene radical and Ph represents a phenyl radical.

9. The process as claimed in claim 1, characterized in that the catalyst comprises the structure:

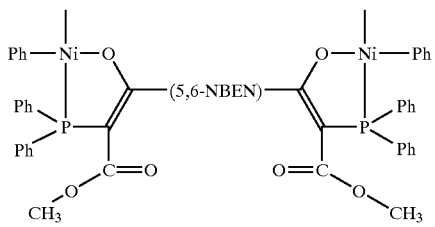

in which (5,6-NBEN) represents a 5,6-bicyclo[2,2,1]hept-2-ene radical and Ph represents a phenyl radical.

10. The process as claimed in claim 1, characterized in that the catalyst is employed in a form of complex having a metal which has valencies, wherein some of the valencies attributed to form the complex and each nonattributed valency of the metal is occupied by a ligand, the ligand subsequently being separated from the catalyst by a scavenger compound to make possible the polymerization.

11. The process as claimed in claim 10, characterized in that the ligand is a phosphine.

12. The process as claimed in claim 10 or 11, characterized in that the scavenger compound is bis(cis,cis-1,5-cyclooctadiene)nickel(0).

13. The process as claimed in claim 1, characterized in that the polymerization medium comprises a liquid organic phase.

14. The process as claimed in claim 13, characterized in that the catalyst is entirely dissolved in a liquid organic phase before the polymerization.

15. The process as claimed in claim 1, characterized in that the emulsifying agent is present up to 10% by weight with respect to the weight of water.

16. The process as claimed in claim 15, characterized in that the emulsifying agent is present in a proportion of 0.01 to 5% by weight with respect to the weight of water.

17. The process as claimed in claim 16, characterized in that the emulsifying agent is present in a proportion of 0.01 to 3% by weight with respect to the weight of water.

18. The process as claimed in claim 1, characterized in that the polymerization medium comprises a liquid organic phase, the catalyst having been mainly dissolved in said liquid organic phase and the emulsifying agent being in an amount greater than the critical micelle concentration.

19. The process as claimed in claim 18, characterized in that the emulsifying agent is in an amount sufficient for the polymerization to take place essentially in the micelles.

20. The process as claimed in claim 1, characterized in that the polymerization medium comprises a liquid organic phase and a cosurfactant.

21. The process as claimed in claim 20, characterized in that the cosurfactant exhibits a solubility in water of less than $1 \times 10^{-3}$ mol per liter at 20° C.

22. The process as claimed in claim 20 or 21, characterized in that the cosurfactant is present up to 10% by weight with respect to the weight of water.

23. The process as claimed in claim 20, characterized in that the ratio of the mass of emulsifying agent to that of cosurfactant ranges from 0.5 to 2.

24. The process as claimed in claim 20, characterized in that the medium is subjected to sufficient shearing for droplets of organic liquid phase bf less than 1 μm to be obtained.

25. The process as claimed in claim 24, characterized in that sufficient shearing is obtained with ultrasound.

26. The process as claimed in claim 1, characterized in that the latex is a high-density polyethylene.

27. The process as claimed in claim 1, characterized in that the latex is a medium-density polyethylene.

28. The process as claimed in claim 1, characterized in that only ethylene is polymerized.

29. The process as claimed in claim 1, characterized in that the aqueous phase comprises at least 50% by weight of water.

30. The process as claimed in claim 29, characterized in that the aqueous phase comprises at least 80% by weight of water.

31. The process as claimed in claim 1, characterized in that the polymerization takes place at a temperature between 25 and 200° C.

32. The process as claimed in claim 1, characterized in that at least one olefin is ethylene.

33. The process as claimed in claim 1, characterized in that the polymerization is carried out at a temperature below the melting point of the polymer to be formed, the polymer to be formed being at least partially crystalline.

34. A latex of a polymer of at least one olefin, prepared according to the process of claim 1.

35. The latex as claimed in claim 34, characterized in that the polymer is high-density polyethylene.

36. The latex as claimed in claim 34, characterized in that the polymer is medium-density polyethylene.

37. The latex as claimed in claim 34, characterized in that the polymer is low-density polyethylene.

* * * * *